Inventor:
Samuel B. Dunne
By: Burmeister, Palmatier & Hamby
Attys.

United States Patent Office 3,564,783
Patented Feb. 23, 1971

3,564,783
SUPERHIGHWAY DRIVER DIRECTION STRUCTURE ERECTIBLE IN THE FIELD
Samuel B. Dunne, Dixon, Ill., assignor to Fosco Fabricators, Inc., Dixon, Ill., a corporation of Pennsylvania
Filed Aug. 5, 1969, Ser. No. 847,607
Int. Cl. E01f 9/01; E04c 3/04
U.S. Cl. 52—38
6 Claims

ABSTRACT OF THE DISCLOSURE

Support structure of light metal for driver direction signs that overlie vehicular passageways on superhighways is erected in the field from standardized components. Preformed tubular webs of light metal are jointed to specially designed tubular chords of light metal by means of integral fins on the chords, specially constructed and strengthened end segments of the webs, preshaped stress-distribution plates of light metal, and bolts mutually integrated into joints that can be readily bolted together tightly in the field to produce a horizontal sign support structure free of looseness and having more than adequate strength and abundant dependability undiminished by hidden structural defects or by outdoor exposure.

The present invention relates to the construction of support structures for overhead signs such as are commonly placed in overlying relation to vehicular pathways along superhighways to conspicuously display essential direction information to drivers.

In principle, the supporting of a driver information sign in this environment would appear to be a simple matter. Nevertheless, the construction and maintenance of support structures for such signs having the requisite reliability has been severely complicated by the rigorous and widely varying requirements of this environment and by severe inherent shortcomings of conventional practices previously used in the fabrication and installation of such sign support structures, with the consequence that the cost heretofore of equipping superhighways with direction information signs has been extremely high and conventional sign support structures provided for this service at great cost have been subject to serious shortcomings and latent defects from the standpoint of problems attending initial construction and subsequent maintenance and service.

Resting on supports which must be spaced a safe distance from the roadway itself, such overhead sign structures extend horizontally across vehicular pathways, frequently crossing many lanes of traffic. The weight of the driver information sign or sign supported is not necessarily insignificant. Moreover, such signs typically present large sail areas exposed to heavy and irregular wind loads eminently capable of inducing powerful vibrations in the support structure. Typically, such horizontal support structure either cantilevers a substantial distance from vertical supports with consequent vulnerability to vibration or it extends long distances across multiple traffic lanes with corresponding vulnerability to rapidly changing dynamic loads induced by wind and vibration.

The failure of such an overhead structure, in which case it would likely fall into the pathway of speeding traffic, could be disastrous with consequent loss of life and injury to vehicular passengers not unlike the probable results from the falling of an elevator. Thus, the dependability demanded of elevators is equally pertinent to the reliability of overhead sign support structures used in this environment.

Unlike elevators, normally sheltered under the watchful eye of mechanics, vehicular sign support structures to which this invention relates are exposed to the havoc of outdoor corrosion that can be aggravated by the corrosive atmosphere prevailing in coastal and metropolitan regions.

Because of its great strength, steel has been widely used in the construction of such sign supports. However, the conventional practice in this regard has been attended by serious problems and weaknesses from the standpoints of construction and maintenance. The vulnerability of steel to corrosion requires constant maintenance to avoid hazardous deterioration. Steel weldments are subject to serious weaknesses at joints containing flaws difficult to detect. The plating of assembled steel structures to avoid corrosion has created a high cost of manufacture and transportation of the massive structures which must be transported after plating.

Ferrous alloys capable of resisting corrosion have been inordinately expensive. The use of light metals inherently resistant to corrosion has been inhibited by the limited strength of such metals and the inability of prior practice to use light metals effectively to produce a practical sign support structure at moderate cost having the requisite strength and dependability.

One object of the invention is to provide for supporting a driver direction sign in overlying relation to a vehicular pathway on a superhighway a horizontal sign support structure constructed of light metal and erected in the field from standardized components fashioned and integrated together to provide the requisite strength and dependability, effective undiminished by prolonged exposure to corrosive outdoor atmospheres, while at the same time minimizing the mass of the structure with consequent significant savings in cost.

Another object is to provide a horizontally extending overhead sign support structure of the character recited having a new and improved construction making erection of the sign support structure in the field feasible using standardized components while at the same time significantly reducing in relation to prior practice the cost of producing installed sign structures and gaining the advantages of corrosion resistance of indefinite duration without the necessity of onsite maintenance after installation.

Another object is to provide a new and improved overhead sign support structure of the character recited that is bolted together from standard components to produce a corrosion-resistant structure immune to hidden and latent defects and having a freedom from looseness that is effectively equal to that of a weldment.

A further object is to provide a horizontally extending support structure for overhead driver direction signs of the character recited in the preceding objects that is effectively immune to looseness or "working" of the component parts in relation to each other with a consequent capability of the structure to withstand vibratory and other dynamic loads applied by wind or otherwise without wear or deterioration.

Other objects and advantages will become apparent from the following description of the exemplary embodiments of the invention illustrated in the drawings, in which.

Figure 1:
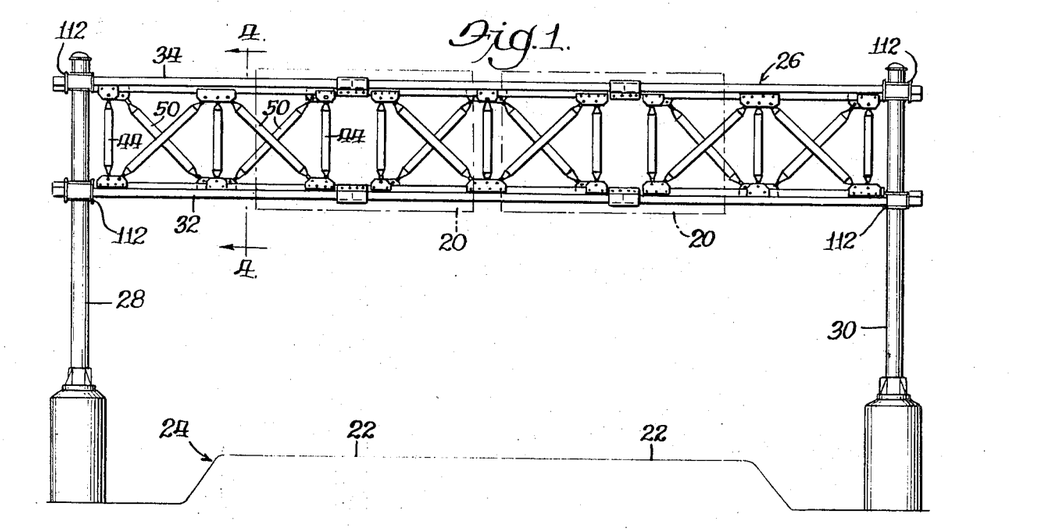
FIG. 1 is an elevational view of an overhead support structure constructed in accordance with the invention for supporting a driver information sign illustrated in phantom in FIG. 1.

Referring to the drawings in greater detail, driver direction signs 20 illustrated in phantom lines in FIG. 1 are supported in overlying relation to vehicular passageways 22 of a superhighway 24 by sign support structure 26 constructed in accordance with the present invention and extending horizontally between vertical support stanchions 28, 30 located on opposite sides of the vehicular passageways 22 and spaced in accordance with current design practice substantial distances from the vehicular passageways 22.

As previously intimated, the sign support structure 26 is subjected to heavy dynamic loads from incipient vibratory forces such as may be applied by wind acting on the rather large sail areas of the overhead sign 20. Moreover, the support structure which sustains itself and such dynamic loads is exposed to the corrosive atmosphere of the outdoor environment in which it is located. Any collapse of the sign structure as a consequence of structural weakness due to latent defects, corrosive weakening of the structure or applied loads or any combination of these or other factors can very well be a cause of severe injuries and loss of life resulting from accidents that can be expected to ensue in the event the structure drops onto one of the underlying vehicular passageways 22.

An effective resistance of the improved support structure 26 to structural weakness developing through corrosion and an effective elimination of latent structural defects such as are characteristic of weldments are obtained in applicant's support structure that is formed almost entirely of light metal components of special, yet standardized design, that are erected in the field and held tightly together by bolts.

Figure 4:
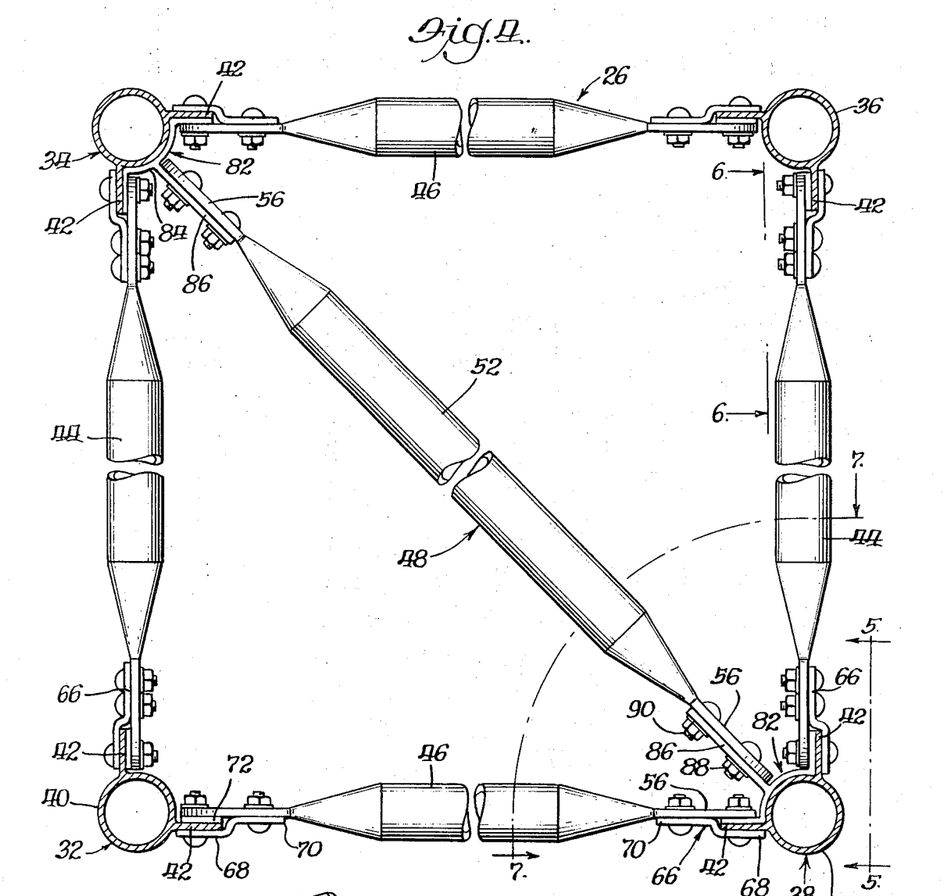
FIG. 4 is a transverse sectional view on an enlarged scale taken with reference to the line 4—4 of FIG. 1.

The sign support structure of FIGS. 1 through 12a has a generally rectangular configuration overall as viewed in transverse section, FIG. 4. The construction 26 comprises, as shown, four spaced parallel corner tubes or chords 32, 34, 36, 38. Formed of light metal, normally aluminum or an aluminum alloy, each corner member comprises a cylindrical wall 40, FIGS. 4 and 7, and a plurality of external longitudinal fins 42 formed integrally with the tubular wall and extending longitudinally along the full length of the tubular corner member or chord 32, 34, 36, 38. The two fins 42 integrally formed on each corner member 32–38 incorporated into the rectangular support structure 26, FIGS. 4 and 7, are disposed at right angles to each other and located in somewhat offset parallel relation to mutually perpendicular planes extending through the axis of the corner member.

As will presently appear, the external longitudinal fins 42 of each tubular corner member or chord 32–38 enhances the inherently strong resistance of the tubular wall 40 of the corner member to bending loads and serves to receive and transmit to the corner member the loads applied by coacting parts joined through the fins 42 with the corner member in a manner to be described which avoids completely any structural weakening of the corner member including its inherently strong tubular wall 40.

Each tubular corner member or chord including its cylindrical wall 40 and its integral fins 42 can be economically formed on a mass production basis as an aluminum extrusion.

The four tubular corner members or chords 32, 34, 36, 38 are rigidly held in spaced parallel relation to each other by a plurality of basically tubular cross members or webs 44, 46, 48, 50 interconnected at opposite ends of each cross member with each other and with the corner tubes or chords in a manner to be described to form a truss pattern designed to sustain in conjunction with the corner tubes bending loads applied to the assembled support structure 26. Each cross member 44–50 is fashioned from tubular aluminum stock or similar stock of other light metal resistant to corrosion. The structural character of all of the cross members is basically similar.

A typical cross member 48, FIGS. 4, and 9 to 12, has a central or medial segment 52, FIG. 4, having the unmodified tubular form of the stock from which the cross member is fashioned and constituting the major portion of the length of the cross member. An elongated metal reinforcing core 54 is disposed longitudinally within terminal end segments 56 constituting opposite ends of the typical cross member 48 illustrated in FIGS. 9 to 12. Each such reinforcing core has a flatted rectangular shape in cross section as illustrated best in FIG. 12. The width of the reinforcing core is preferably substantially less than the diameter of the tubular medial segment 52 of the cross member and the thickness of the reinforcing core is only a minor fraction of the width of the reinforcing core as illustrated.

Each longitudinal end segment 56 is contracted in its cross sectional size and shape to fit snugly around the corresponding core member 54. Such reshaping of each tubular end segment 56 from an initially cylindrical shape to the smaller rectangular shape of the end segment 56 reduces the cross sectional periphery of the initially tubular structure with consequent thickening of the wall of the end segment. The strength of the end segment 56 arising from the thickening of the wall of the end segment is augmented by the strength of the metal core 54 snugly encased within the rectangularly shaped end segment.

Each cross member end segment 56 is integrally joined with the medial cylindrical segment 52 of the cross member by an intervening connecting segment 58 of the cross member that changes progressively along its length in size and shape from the end segment 56 with which it merges integrally at one end to the cylindrical size and shape of the central segment 48 with which it merges integrally at its opposite end. Thus, each intermediate segment 58 has the general shape of a truncated cone modified to progress from a circular shape at one end to a rectangular shape at the other end which fits closely around the rectangular core 54. The overall size of each intermediate segment 58 is reduced progressively toward the end segment 56 with a corresponding thickening of the wall of the intermediate segment 58.

The end segment 56 and the adjacent intermediate segment 58 on each end of each cross member are contracted and formed to the desired shape and size of the respective segments preferably by swaging of the tubular stock from which the cross member is fashioned.

Figure 9:
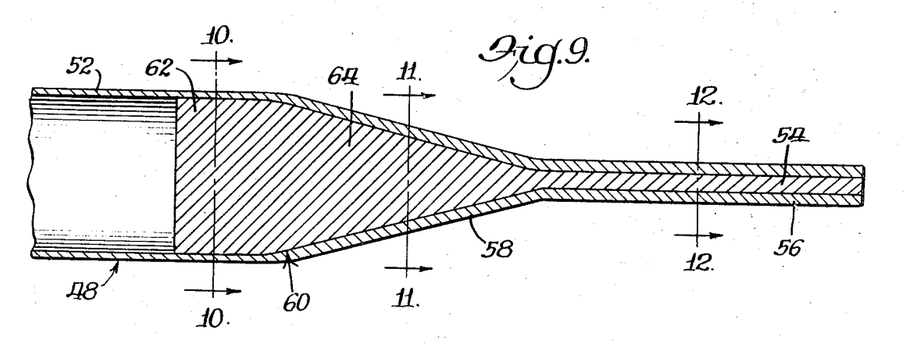
FIG. 9 is a longitudinal sectional view on an enlarged scale of one end of a typical cross member or web.
Figure 10:
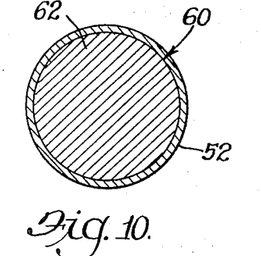
FIG. 10 is a sectional view of the web taken with reference to the line 10—10 of FIG. 9.
Figure 11:
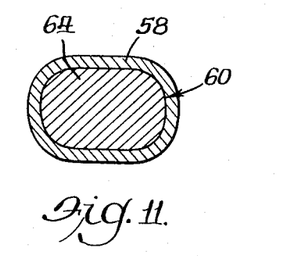
FIG. 11 is a similar transverse sectional view taken with reference to line 11—11 of FIG. 9.

As illustrated in FIGS. 9 through 12, the inner end of the rectangular core 54 encased within the contracted end segment 56 connects with a core extension denoted generally in FIG. 9 by the number 60. The core extension 60 includes on its inner end a short cylindrical core segment 62 dimensioned to fit closely within the adjacent end of the tubular central segment of the cross member. Between the cylindrical inner end segment 62 and the flattened rectangular core 54, the core extension 60 is shaped to fill the space within the surrounding intervening segment 58 of the cross member and has the same general shape in cross section as shown in FIG. 11, the portion of the core extension 60 filling the surrounding intervening segment 58 of the cross member being denoted in FIGS. 9 and 11 by the number 64. The presence of the core extension 60 within the surrounding portion of the cross member can be used to advantage in accurately determining the cross sectional shape of the swaged encasing portion of the cross member and adds structural strength to the overall end portion of the cross member.

Figure 13:
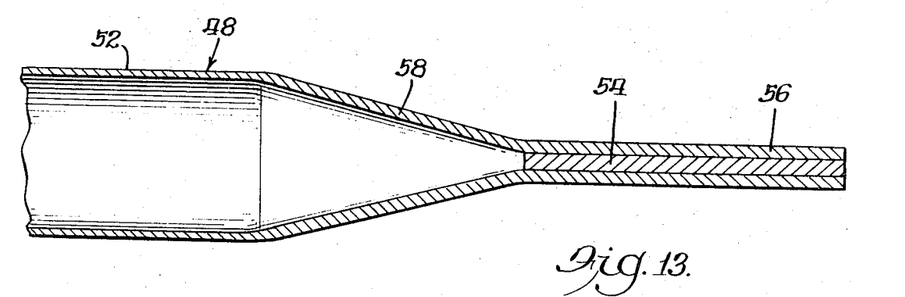
FIG. 13 is a transverse sectional view of one end of a typical web incorporating a modified construction.

As shown in FIG. 13, the reinforcing core 54 can be placed in the end segment 56 and used without the inner core extension 60 illustrated and described with reference to FIGS. 9, 10 and 11, the construction of the typical cross member 48 being otherwise the same as that illustrated in FIGS. 9 through 12.

As illustrated in FIGS. 1 through 4, the cross members 44 are disposed in vertical planes in parallel relation to vertically extending fins 42 on the corner tubes 32–38 and the cross members 46 are similarly disposed in horizontal planes parallel to other fins 42 on the corner tubes 32–38. Some of the cross members 44, 46 extend transversely between the corner tubes 32–38 and other cross members 50 extend diagonally between adjacent corner tubes in triangular patterns that are intrinsically stable providing between the parts a truss relationship for supporting static and dynamic bending loads on the structure. The cross members 48 extend diagonally between diagonally opposite corner tubes 34, 38 to which the cross members 48 are connected in the manner to be described to make the structure 26 structurally stable transversely as shown in FIG. 4.

As previously intimated, the support structure 26 is erected in the field where the ends of the upright cross members 44 are placed in overlapping relation to the corresponding vertical fins 42 on the adjacent upper and lower corner tubes 32–38 and opposite ends of the horizontal cross members 46 are placed in overlapping relation to the corresponding horizontal fins 42 of the adjacent corner tubes.

At each juncture of one of the corner tube fins 42 with an adjacent end of a cross member disposed in overlapping relation to the fin, a stress distributing or gusset plate 66 preformed of light metal is placed alongside the fin 42 so that a flat marginal edge 68 of the stress distributing plate 66 overlaps the side of the fin 42 opposite from the side of the fin overlapped by the cross member. The stress distributing plate 66 is made of thick stock material capable of carrying much stress without bending and is dimensioned to extend a rather extensive distance along the adjacent fin 42 to allow connection of the plate and fin by three or more bolts as will be described. Moreover, each stress distributing plate 66 is dimensioned in a transverse direction with respect to the coacting fin 42 to project beyond the fin in overlapping relation to the adjacent end segment 56 of the connected cross member to a degree such that the extent of projection of the plate 66 beyond the fin 42 is preferably substantially greater than the transverse width of the fin 42 itself.

Figure 12:
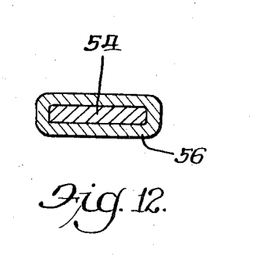
FIG. 12 is a transverse sectional view taken with reference to the line 12—12 of FIG. 9.
Figure 12A:
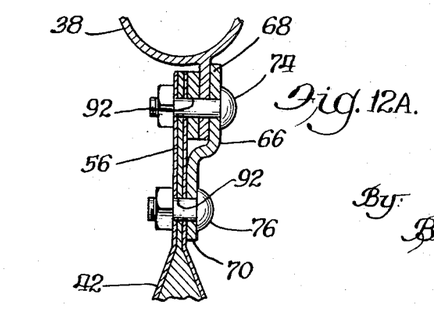
FIG. 12a is a sectional view taken with reference to the line 12a—12a of FIG. 6.

The outwardly projecting portion of the stress distributing plate 66 denoted in the drawings by the number 70 is laterally offset as shown in FIGS. 4, 7 and 12a to fit flat against the end segment 56 of the adjacent cross member.

In the preferred construction illustrated, the longitudinal segment of the fin 42 overlapped by the marginal edge 68 of each stress distributing plate 66 is sandwiched between the stress distributing plate marginal edge 68 and a second stress distributing element 72, FIGS. 4, 6 and 12a, designed to fit flat against the fin 42 and being generally coextensive in width and length with the distributing plate marginal edge 68 overlapping the opposite side of the fin. The second stress distributing element 72 is disposed in intervening relation between the fin 42 and the overlapping end of the cross member.

The mutually overlapping end of the cross member 44, for example, FIGS. 4, 6 and 12a, the stress distributing element 72, fin 42 and the marginal edge 68 of the stress distributing plate 66 are rigidly bound together by a common bolt 74 preferably formed of steel and treated to resist corrosion. Bolts suitable for this purpose and effectively immune to deterioration from corrosion are available commercially. A second bolt 76 spaced a substantial distance from the bolt 74 is used to connect the typical cross member end segment 56 with the offset projecting portion 70 of the stress distributing plate 66.

As previously intimated and as shown in FIGS. 4, 6 and 12a, the stress distributing plate 66 and the stress distributing element 72 embracing the intervening fin 42 extend substantial distances along the fin to laterally opposite sides of the cross member end engaged by the bolt 74. Two additional bolts 78, 80 extend through the respective ends of the stress distributing element 72 and adjacent portions of the fin 42 and the stress distributing plate 66 with the consequence that the force in the typical cross member 44 is distributed along an extensive length of the fin 42 with the consequence that a powerful force can be transmitted through the fin 42 to the corresponding corner tube while at the same time limiting to a very low value the stress on the finned structure of the corner tube. At the same time the stress distributing plate 66 together with the two spaced bolts 74, 76 distribute the stress on the typical truss member 44 along a substantial length of the strengthened cross member end segment 56 to avoid overstressing of the light metal structure of the cross member.

Figure 5:
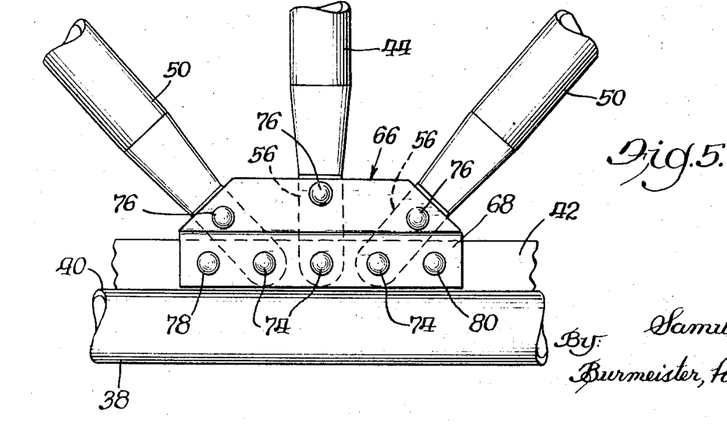
FIG. 5 is a fragmentary detail view on a still larger scale taken with reference to the line 5—5 of FIG. 4.
Figures 6, 7, 8:
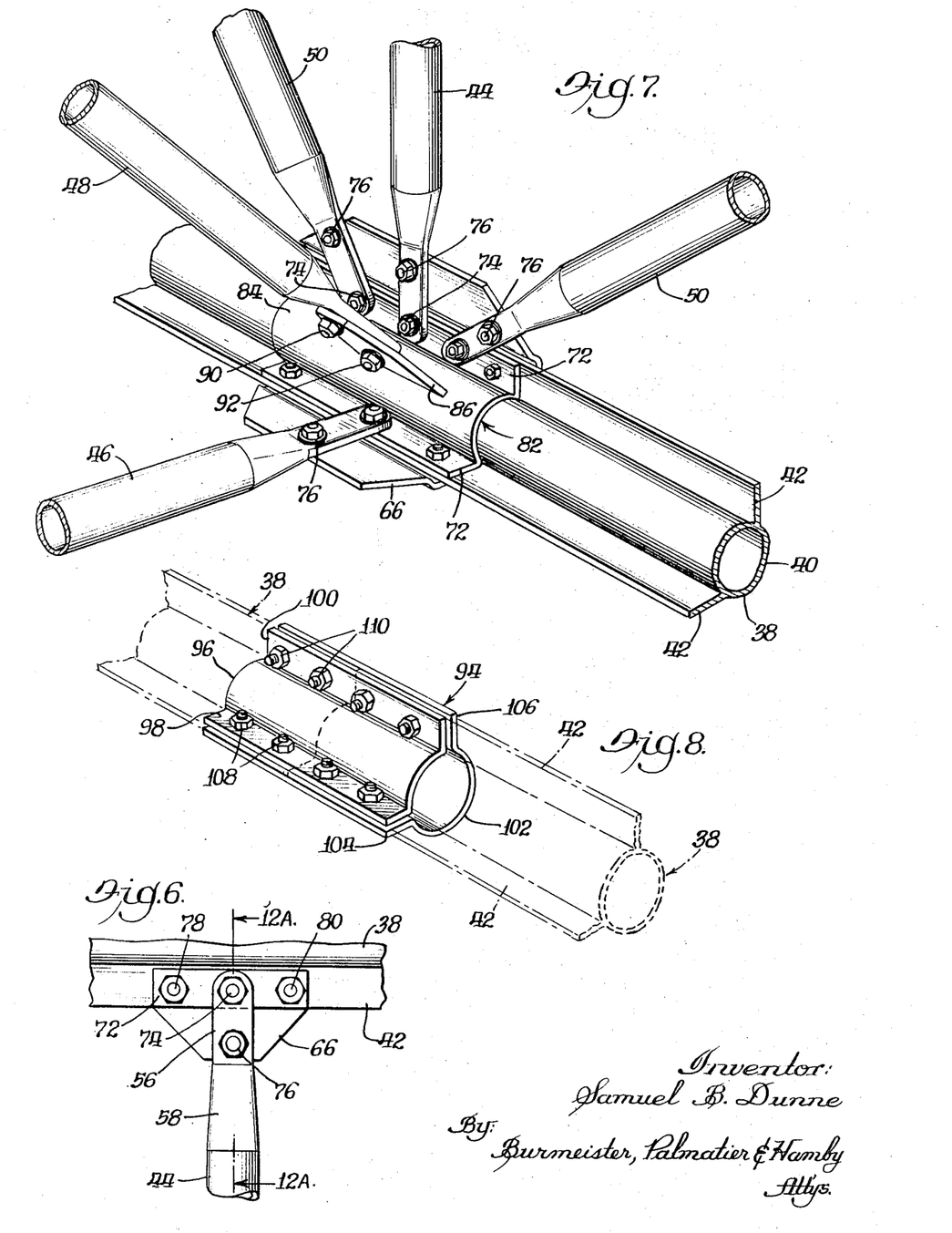
FIG. 6 is a fragmentary detail view taken with reference to the line 6—6 of FIG. 4.
FIG. 7 is a perspective view taken generally with reference to the line 7—7 of FIG. 4.
FIG. 8 is a detailed perspective view showing a coupling used to connect adjacent corner tubes, illustrated in phantom.

As shown best in FIGS. 5 and 7, there are in the support structure 26 a number of common junctures of a plurality of cross members with each other and with an adjacent corner tube. A single juncture may include, for example, the connection of the corner tube 38 with a transverse cross member 44 and two diagonal cross members 50. Basically, a common juncture of a plurality of cross members with a corner tube fin 42 is similar to that of the juncture of a single cross member with the fin 42 previously described with reference to FIGS. 6 and 12a.

At a common juncture of a plurality of cross members with a corner tube, the stress distributing plate 66 is dimensioned to extend further along the adjacent fin 42 to accommodate the overlapping ends of the increased number of cross members and to distribute the stress along a greater length of the fin 42. As shown in FIGS. 5 and 7, the end segment 56 of each connected cross member is secured to the stress distributing plate 66 in the manner described by two bolts 74, 76, the plate 66 being connected to the web or fin 42 in FIG. 5 by five bolts 78, 74, 80, as shown. The stress distributing element 72 extends a corresponding distance along the fin 42.

Opposite ends of the transversely diagonal cross member 48 are connected to the diagonally opposite corner tubes 34, 38 by means of preformed connecting saddles 82 shaped respectively to fit against the adjacent corner tube between its projecting fins 42. As shown in FIGS. 4 and 7, each saddle 82 comprises an elongated central segment 84 shaped in the form of a quadrant of a cylinder to fit against the cylindrical wall 40 of the adjacent corner tube and joined integrally along its opposite edges with two stress distributing elements 72 forming component elements of the junctures of adjacent horizontal and upright cross members with the adjacent corner tube in the manner described. Each saddle 82 also includes a flat stress distributing plate 86 integral with the central portion 84 of the saddle and projecting a sufficient distance therefrom in parallel relation to the adjacent diagonal cross member 48 to overlap substantially the full length of the adjacent end segment 56 of the cross member 48. Two bolts 88, 90 are used to secure the plate 86 firmly to the adjacent cross member end segment 56 as shown in FIGS. 4 and 7.

The various bolts 74, 76, 78, 80, 88 and 90 used in the bolted junctures described are dimensioned in relation to the holes in the coacting parts, denoted in FIG. 12a by the number 92, through which the bolts extend so that the bolts and holes have an interference fit with respect to each other. As a consequence, the bolts fit tightly in each part through which the bolts pass with an obviation of looseness in the erected structure equal to that which could be obtained in a weldment.

Figure 2:
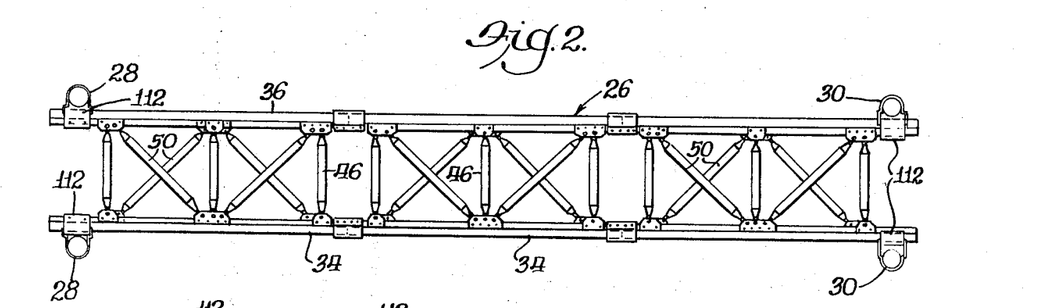
FIG. 2 is a plan view of the support structure of FIG. 1.
Figure 3:
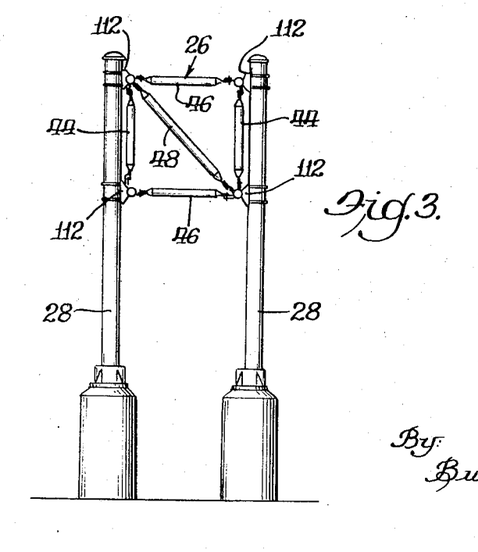
FIG. 3 is a left end view of the support structure of FIG. 1.

Structures 26 of extensive length designed to overlie a multiplicity of lanes of traffic can be erected using finned corner tubes 32–38 of a length much shorter than that of the overall structure. Thus, as shown in FIGS. 1, 2 and 8, continuing coaxial segments of each corner tube are firmly connected together by means of a bolted two-part coupling 94. The coupling comprises a first part 96 formed as a quadrant of a cylinder shaped to fit against and extend substantial distances longitudinally along abutting end segments of two corner tubes 38, for example, as shown in FIG. 8. The part 96 extends between the adjacent corner element fins 42 and has flat marginal edges 98, 100 which fit against the fins 42. The other part 102 of the coupling 94 is similarly shaped but dimensioned to fit around the obtuse angle between the fins 42 and includes marginal edges 104, 106 parallel to the marginal edges 98, 100. The marginal coupling edge 98 is connected as shown by four bolts 108 through one fin 42 with the opposing marginal edge 104 and four bolts 110 are used to connect the marginal edges 100 and 106 through the intervening fin 42, the bolts having an interference fit with the coacting parts to obviate looseness. The support structure 26 thus formed and erected in the field is supported on the stanchions 28, 30 illustrated in FIGS. 1, 2 and 3 by suitable brackets 112 fastened to the stanchions 28, 30 and connected in supporting relation to the finned corner tubes 32–38.

Figures 14, 15, 16:
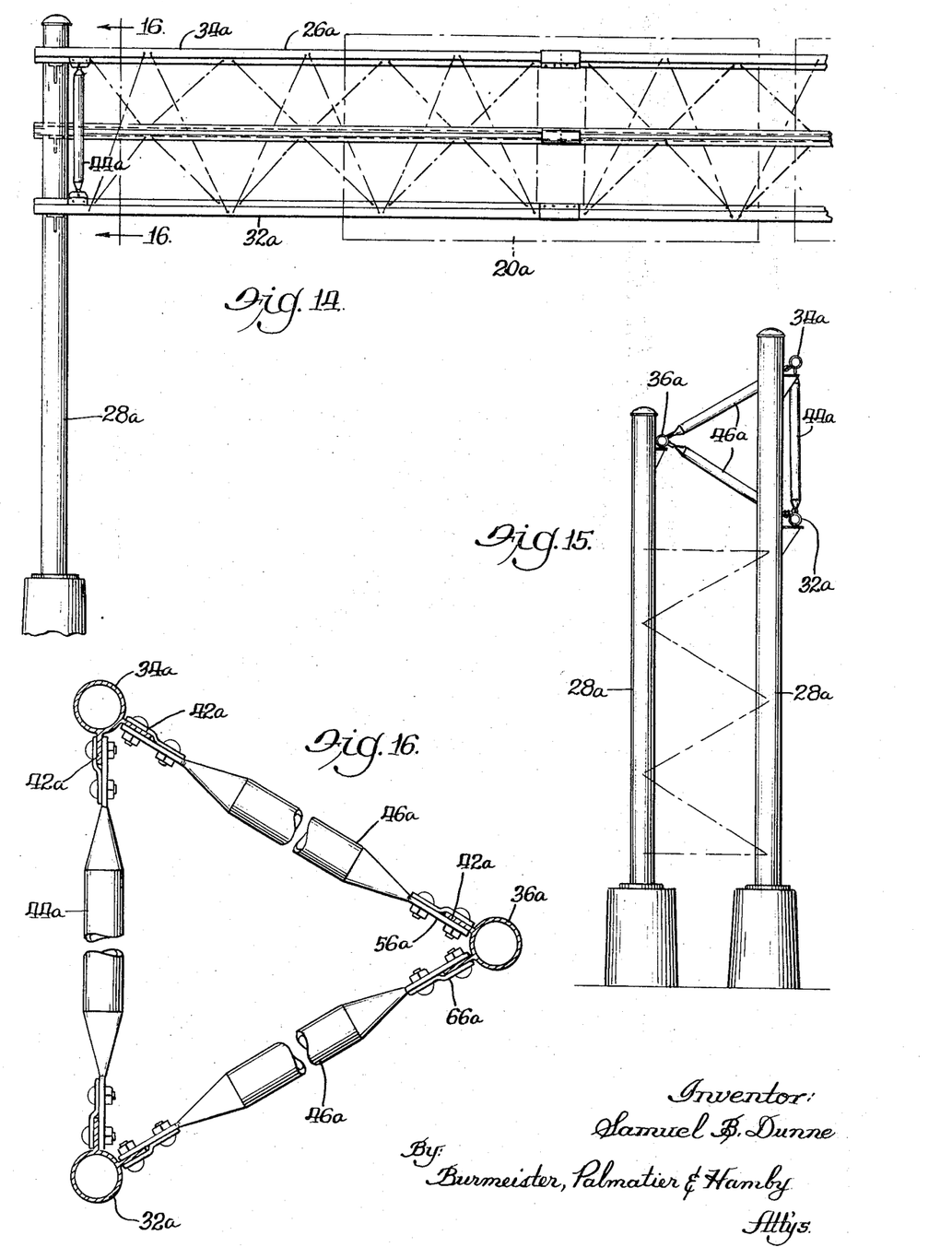
FIG. 14 is an elevational view of one end of the modified sign support structure incorporating the invention.
FIG. 15 is a left end view of the sign support structure of FIG. 14.
FIG. 16 is a transverse sectional view on an enlarged scale taken with reference to the line 16—16 of FIG. 14.

In the modified embodiment of the invention illustrated in FIGS. 14 to 16, component elements corresponding to those incorporated into the previously described embodiment of the invention illustrated in FIGS. 1 through 13 are denoted by the same reference number with the addition of the suffix a.

The sign support structure 26a illustrated in FIGS. 14 to 16 differs basically from that of FIGS. 1 through 13 in that the construction 26a has a triangular configuration as viewed in transverse section. FIG. 16, rather than a rectangular configuration. The upper and lower cross members 46a connect with a common rear corner tube 36a, as shown in FIG. 16. The fins 42a on each corner tube extend respectively in the direction of the two other corner tubes and are connected in the manner described with the adjoining cross member.

The support structure 26a by virtue of its triangular shape in transverse section is inherently stable with the consequent lack of any necessity to provide a transversely diagonal cross member like the cross member 48 as shown in FIG. 4. In the construction 26a, the stress distributing plates 66a are made sufficiently sturdy to adequately distribute the stress along the fins 42a in conjunction with the direct engagement of the cross member end segments 56a with the fins 42a.

The invention is claimed as follows:

1. For supporting a driver direction sign in overlying relation to a vehicular passageway on a superhighway, a horizontal support structure of light metal erectible in the field from standard components comprising, in combination, a plurality of horizontal corner tubes disposed in generally spaced relation to each other, each of said corner tubes being formed of light metal and comprising a cylindrical wall and a plurality of longitudinal fins integral with said cylindrical wall and extending longitudinally therealong at angles with respect to each other, a plurality of tubular cross members formed of light metal, each of said cross members having end segments on opposite ends and having a tubular medial segment extending between said end segments, a metal reinforcing core extending longitudinally within each end segment of each cross member and having a flatted rectilinear shape in cross section, each end segment of each cross member being shaped and dimensioned to fit snugly around the corresponding core therewithin, each end segment of each cross member being integrally joined with the tubular medial segment of the cross member by an intervening connecting segment of the cross member that changes progressively in size and shape from a merger of the intervening segment with the end segment to a merger of the intervening segment with the tubular medial segment, said cross members extending between said corner tubes in a truss pattern designed to maintain said corner tubes in a predetermined relation to each other and to sustain in conjunction with the corner tubes bending loads applied to the assembly of corner tubes and cross members, each cross member being parallel to one of said fins on each of the two corner tubes between which the cross member extends, each end segment of each cross member overlapping a fin of the adjacent corner tube, a stress distributing plate overlapping each cross member end segment and overlapping an adjacent portion of substantial length of the corresponding corner tube fin; and a plurality of bolts bolting together each mutually overlapping cross member end segment, stress distributing plate and corner tube fin in a plurality of locations therealong at the juncture of each cross member end segment and the corresponding corner tube fin.

2. For supporting a driver direction sign in overlying relation to a vehicular pasageway on a superhighway, a horizontal support structure of light metal erectible in the field from standard components comprising, in combination, a plurality of horizontal corner tubes disposed in generally spaced relation to each other, each of said corner tubes being formed of light metal and comprising a cylindrical wall and a plurality of longitudinal fins integral with said cylindrical wall and extending therefrom toward other ones of the corner tubes, a plurality of tubular cross members formed of light metal, each of said cross members having end segments on opposite ends and having a tubular medial segment extending between said end segments, a metal reinforcing core extending longitudinally within each end segment of each cross member, each end segment of each cross member being shaped and dimensioned to fit snugly around the corresponding core therewithin, each end segment of each cross member being integrally joined with the tubular medial segment of the cross member, said cross members extending between said corner tubes in a truss pattern designed to maintain said corner tubes in a predetermined relation to each other and to sustain in conjunction with the corner tubes bending loads applied to the assembly of corner tubes and cross members, each cross member being generally parallel to one of said fins on each of the two corner tubes between which the cross member extends, each end segment of each cross member overlapping a fin parallel therewith on the adjacent corner tube, a stress distributing plate overlapping each cross member end segment and overlapping an adjacent portion of substantial length of the corresponding corner tube fin; and a plurality of bolts bolting together each mutually overlapping cross member end segment, stress distributing plate and corner tube fin in a plurality of locations therealong at the juncture of each cross member end segment and the corresponding corner tube fin.

3. A driver direction sign structure erectible in the field from standard components and comprising a plurality of horizontal corner tubes disposed in spaced relation to each other, each of said corner tubes being formed of light metal and comprising a cylindrical wall and a plurality of longitudinal fins integral with said cylindrical wall and extending therefrom toward other ones of the corner tubes, a plurality of tubular cross members formed of light metal, each of said cross members having end segments on opposite ends and having a tubular medial segment extending between said end segments, a metal reinforcing core extending longitudinally along each end segment of each cross member, said cross members extending between said corner tubes in a truss pattern designed to maintain said corner tubes in a predetermined relation to each other and to sustain in conjunction with the corner tubes bending loads applied to the assembly of corner tubes and cross members, each cross member being generally parallel to one of said fins on each of the two corner tubes between which the cross member extends, each end segment of each cross member overlapping a fin parallel therewith on the adjacent corner tube, a stress distributing plate overlapping each cross member end segment and overlapping an adjacent portion of substantial length of the corresponding corner tube fin; a plurality of fastening elements fastened through the mutually overlapping cross member end segments, stress distributing plates and corner tube fins in a plurality of locations therealong at the juncture of each cross member end segment and the corresponding corner tube fin; a stationary vertical support positioned alongside a highway in spaced relation to vehicular passageways on the highway, means mounting the support structure of corner tubes and cross members on said stationary vertical support to extend horizontally therefrom into overlying relation to a vehicular passageway on the highway, and an overhead driver direction sign mounted on said support structure above a vehicular passageway on the highway.

4. A driver direction sign structure erectible in the field from standard components and comprising four mutually spaced horizontal corner tubes disposed respectively in the four corners of a horizontal pattern rectangular in cross section, each of said corner tubes being formed of light metal and comprising a cylindrical wall and two longitudinal fins integral with said cylindrical wall and extending at right angles with respect to each other toward the two adjacent corner tubes, a plurality of tubular cross members formed of light metal, each of said cross members having end segments on opposite ends and having a tubular medial segment extending between said end segments, a metal reinforcing core extending longitudinally within each end segment of each cross member and having a flatted rectilinear shape in cross section, each end segment of each cross member being shaped and dimensioned to fit snugly around the corresponding core therewithin, each end segment of each cross member being integrally joined with the tubular medial segment of the cross member by an intervening connecting segment of the cross member that changes progressively in size and shape from a merger of the intervening segment with the end segment to a merger of the intervening segment with the tubular medial segment, each reinforcing core having on the inner end thereof a core extension shaped to fill the corresponding connecting segment of the cross member, said cross members extending between said corner tubes in a truss pattern designed to sustain in conjunction with the corner tubes bending loads applied to the assembly of corner tubes and cross members, each cross member being parallel to one of said fins on each of the two corner tubes between which the cross member extends, each end segment of each cross member overlapping a fin of the adjacent corner tube, a stress distributing plate overlapping each cross member end segment and overlapping an adjacent portion of substantial length of the corresponding corner tube fin; a plurality of bolts bolting together each mutually overlapping cross member end segment, stress distributing plate and corner tube fin in a plurality of locations therealong at the juncture of each cross member end segment and the corresponding corner tube fin, a plurality of saddles positioned along diagonally opposite corner tubes at junctures with said corner tubes of said cross members; each saddle having a central portion shaped generally as a quadrant of a cylinder to fit against the adjacent corner tube between said fins thereon and having marginal edges overlapping adjacent ones of said fins, stress distributing plates and cross member end segments and being bolted in overlapping relation thereto by said bolts, each saddle including a stress distributing plate projecting from said central portion of the saddle diagonally toward the diagonally opposite corner tube, a plurality of diagonal web members similar in construction to said individual cross members, each of said diagonal web members extending between diagonally opposite cross members and having end segments mutually overlapping stress distributing plates of adjacent saddles, a plurality of bolts extending through and bolting together each web end segment and the overlapping stress distributing plate of the adjacent saddle, a stationary vertical support positioned alongside a highway in horizontally spaced relation to vehicular passageways on the highway; means mounting the assembly of corner tubes, cross members and webs on said stationary vertical support to extend horizontally therefrom into overlying relation to a vehicular passageway on the highway; and an overhead driver direction sign mounted on said assembly above a vehicular passageway on the highway.

5. For supporting a driver direction sign in overlying relation to a vehicular passageway on a superhighway, a horizontal support structure erectible in the field from standard components and comprising a plurality of horizontal corner tubes disposed in spaced relation to each other, each of said corner tubes being formed of light metal and comprising a cylindrical wall and a plurality of longitudinal fins integral with said cylindrical wall and extending therefrom toward other ones of the corner tubes, a plurality of tubular cross members formed of light metal, each of said cross members having end segments on opposite ends and having a tubular medial segment extending between said end segments, a metal reinforcing core extending longitudinally along each end segment of each cross member, said cross members extending between said corner tubes in a truss pattern designed to maintain said corner tubes in a predetermined relation to each other and to sustain in conjunction with the corner tubes bending loads applied to the assembly of corner tubes and cross members, each cross member being generally parallel to one of said fins on each of the two corner tubes between which the cross member extends, each end segment of each cross member overlapping a fin parallel therewith on the adjacent corner tube, a stress distributing plate overlapping each cross member end segment and overlapping an adjacent portion of substantial length of the corresponding corner tube fin; a plurality of fastening elements fastened through the mutually overlapping cross member end segments, stress distribtuing plates and corner tube fins in a plurality of locations therealong at the juncture of each cross member end segment and the corresponding corner tube fin.

6. For supporting a driver direction sign in overlying relation to a vehicular passageway on a superhighway, a horizontal support structure of light metal erectible in the field from standard components and comprising, in combination, a plurality of horizontal corner tubes disposed in generally spaced relation to each other, each of said corner tubes being formed of light metal and comprising a cylindrical wall and a plurality of longitudinal fins integral with said cylindrical wall and extending therefrom toward other ones of the corner tubes, a plurality of tubular cross members formed of light metal, each of said cross members having end segments on opposite ends and having a tubular medial segment extending between said end segments, a metal reinforcing core extending longitudinally within each end segment of each cross member, each end segment of each cross member being shaped and dimensioned to fit snugly around the corresponding core therewithin, each end segment of each cross member being integrally joined with the tubular medial segment of the cross member, said cross members extending between said corner tubes in a truss pattern designed to maintain said corner tubes in a predetermined relation to each other and to sustain in conjunction with the corner tubes bending loads applied to the assembly of corner tubes and cross members, each cross member being generally parallel to one of said fins on each of the two corner tubes between which the cross member extends, each end segment of each cross member overlapping one side of a fin parallel therewith on the adjacent corner tube, a stress distributing plate overlapping each cross member end segment in parallel contact therewith and having an offset marginal edge overlapping the side of the adjacent fin opposite from said one side; a first bolt bolting together each mutually overlapping cross member end segment, stress distributing plate and corner tube fin; a second bolt bolting together each cross member end segment and the adjacent stress distributing plate in spaced relation to the adjacent first bolt, and two additional bolts bolting each stress distributing plate to the adjacent fin and being spaced from the adjacent first bolt.

References Cited

UNITED STATES PATENTS

| | | | |
|---|---|---|---|
| 435,155 | 8/1890 | Schemann | 52—690X |
| 1,808,692 | 6/1931 | Sudduth | 40—125H |
| 2,765,554 | 10/1956 | Anderson et al. | 40—128 |
| 3,007,232 | 11/1961 | Thiry | 52—693X |
| 3,255,301 | 6/1966 | Christofferson | 52—693X |
| 3,270,478 | 9/1966 | Attwood | 52—648 |

PRICE C. FAW, JR., Primary Examiner

U.S. Cl. X.R.

40—125; 52—693; 248—221